May 15, 1962  B. BLAY  3,034,352
MEANS FOR THE MEASUREMENT OF THE FLOW OF A GAS
Filed Jan. 23, 1959
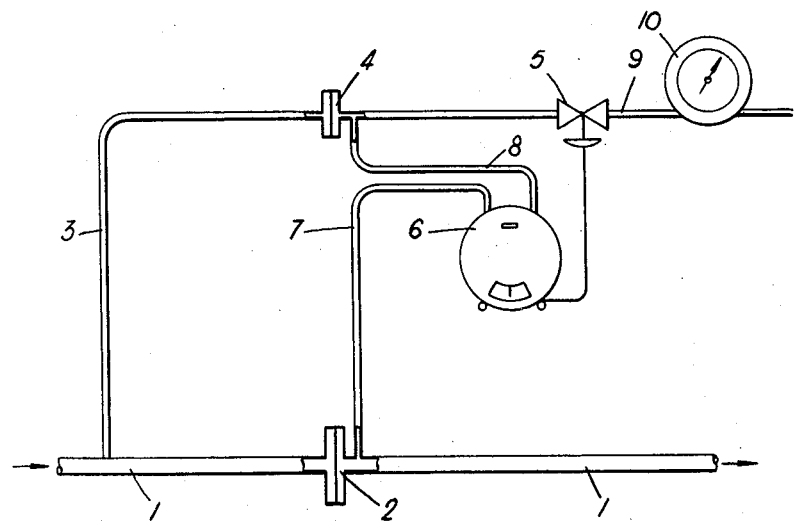
Inventor
BENJAMIN BLAY
By
Aaron L. Townshend Attorney

3,034,352
MEANS FOR THE MEASUREMENT OF THE FLOW OF A GAS
Benjamin Blay, Luton, England, assignor to The British Oxygen Company Limited, a British company
Filed Jan. 23, 1959, Ser. No. 788,645
Claims priority, application Great Britain Feb. 4, 1958
3 Claims. (Cl. 73—202)

This invention relates to a means for measuring the flow of a gas.

It is an object of the present invention to provide means for measuring the flow of a gas and more particularly of gas flows which are themselves very large and which also fluctuate over a wide range and within short intervals of time.

According to another aspect of the invention, means for measuring the flow of a gas under a pressure of not less than 250 p.s.i.g. comprises a first fixed orifice located in a pipe through which the gas is constrained to flow, a second fixed orifice of diameter substantially smaller than that of the first fixed orifice, means for diverting a small proportion of the gas from upstream the first fixed orifice and passing it through the second orifice, means for controlling the flow of gas through the second fixed orifice in such manner that the pressures downstream the first and second fixed orifices are equal and means for measuring the flow of the gas through the second orifice under atmospheric conditions of temperature and pressure.

The term "orifice" as used herein is intended to cover any means for constricting the flow of gas so as to create a pressure differential between the gas on opposite sides of the orifice.

One arrangement according to the invention is shown diagrammatically in the accompanying drawing.

Referring to the drawing, the gas whose flow is to be measured is constrained to flow through a pipe 1 in which is mounted a conventional orifice plate 2.

A small portion of the gas flow is diverted through a bleed line 3 of diameter substantially less than that of the pipe 1 and connected to the pipe 1 upstream of the orifice plate 2. In the bleed line 3 is mounted a second orifice plate 4, the orifice diameter of which is substantially smaller than that of the orifice of plate 2. The gas emerging from the second orifice plate is expanded to atmospheric pressure through a valve 5 controlled by a differential pressure controller 6 connected to the downstream sides of the orifice plates 2 and 4 by any suitable differential pressure tapping, such as the "corner tap" position, by conduits 7 and 8 respectively. The controller 6 is set to zero differential pressure and operates the valve 5 to permit a flow of gas to pass through the valve such that the pressures downstream of the orifice plates 2 and 4 are equal. The flow through the orifice plate 4 is expanded to atmosphere through valve 5 at conditions below the critical pressure ratio, and the flow will therefore be unaffected by any variations in downstream pressure.

The flow of gas through the valve 5 is delivered through a conduit 9 to a standard positive displacement integrating gas meter 10 which is arranged to measure the rate of gas flow through the valve 5 at atmospheric pressure and temperature.

The rate of flow of a gas passing through an orifice in a pipe is given by the formula:

$$Q = \frac{Kd^2}{\sqrt{1-d^2/D^2}} \cdot \sqrt{h} \cdot \sqrt{P_1/T.\delta}$$

where $Q$ is the rate of flow in cu. ft./hour measured at atmospheric pressure and temperature
$d$ is the orifice diameter
$D$ is the pipe diameter
$h$ is the differential pressure
$P_1$ is the absolute upstream pressure
$T$ is the absolute upstream temperature
$\delta$ is the specific gravity
$K$ is a constant In the present case, the differential pressure $h$, absolute pressure $P_1$, temperature $T$ and specific gravity $\delta$ are the same for both orifice plates 2 and 4. The rate of flow through the orifice 4 in the bleed line 3 will therefore be a constant proportion of that through the main pipe 1, depending on the relative diameters of the pipes and orifices. The measurement obtained from the integrating flowmeter 10 when multiplied by a constant factor, will therefore give the true flow of gas in the main pipe 1.

The accuracy of measurement of the flow rate through the main pipe 1 will therefore be directly related to that of the integrating flowmeter 10. Such instruments may be arranged to have a relatively small error over the relatively low flow rate and considerable flow rate fluctuations at which this meter will be required to operate.

The formula given above is correct over a wide range of flow conditions, but it has been found that at both very high and very low rates there is some divergence from the formula. The method and means of the present invention can, however, be used over the whole range between the very high flow rate at which the relationship between $Q$ and $\sqrt{h}$ just departs from linearity and the low flow rate at which the Reynolds number falls below 3000.

The present invention is particularly suitable for gases at a high pressure and, indeed, the minimum practicable static pressure is 250 p.s.i.g.

Flowmeters constructed in accordance with the present invention have been found to be particularly suitable for the measurement of large oxygen supplies to steelworks and chemical works where an accurate knowledge of the total gas supplied over a fixed period is frequently required.

I claim:

1. Means for measuring the flow of a gas under a pressure of not less than 250 pounds per square inch gauge comprising a pipe through which the gas is constrained to flow, a first fixed orifice located in said pipe, a bleed line of diameter substantially less than that of said pipe connected to said pipe at a point upstream of said first fixed orifice, a second fixed orifice of diameter substantially smaller than that of said first fixed orifice located in said bleed line, an expansion valve for expanding gas passing through said second fixed orifice to atmospheric pressure, a meter for measuring the flow of gas through said expansion valve and connected to the low pressure side of said valve, and control means for automatically controlling the operation of said expansion valve in accordance with the differential pressure between the downstream sides of said first and second fixed orifices to maintain said differential pressure at zero.

2. Means according to claim 1 wherein said control means is a differential pressure controller connected to the downstream side of each orifice.

3. Means according to claim 1 wherein said meter is a positive displacement integrating gas meter.

References Cited in the file of this patent

UNITED STATES PATENTS

| | | |
|---|---|---|
| 2,207,840 | Tornquist | July 16, 1940 |
| 2,297,408 | Hardebeck | Sept. 29, 1942 |
| 2,367,176 | Ablstrom et al. | Jan. 16, 1945 |

FOREIGN PATENTS

| | | |
|---|---|---|
| 708,438 | France | July 23, 1931 |